United States Patent

Sanders

[15] 3,671,868
[45] June 20, 1972

[54] SUPERREGENERATIVE MICROWAVE RECEIVER

[72] Inventor: Bobby J. Sanders, Pacoima, Calif.

[73] Assignee: The Bendix Corporation

[22] Filed: Jan. 21, 1970

[21] Appl. No.: 4,641

[52] U.S. Cl............................................325/445, 325/428
[51] Int. Cl.......................................................H04b 1/26
[58] Field of Search..................325/352, 428, 445, 429, 449, 325/363; 333/73 S, 84 M; 329/160

[56] References Cited

UNITED STATES PATENTS

| | | | |
|---|---|---|---|
| 3,500,398 | 3/1970 | Beaty | 325/429 X |
| 3,434,063 | 3/1969 | Watters | 325/429 X |
| 3,470,483 | 9/1969 | Wagner | 325/445 X |
| 3,353,181 | 11/1967 | Preuss | 325/363 X |
| 3,402,340 | 9/1968 | Ringereide | 325/449 X |
| 3,350,649 | 10/1967 | Blaeser | 325/449 |

*Primary Examiner*—Robert L. Richardson
*Assistant Examiner*—Kenneth W. Weinstein
*Attorney*—Robert C. Smith and Plante, Arens, Hartz, Smith and Thompson

[57] ABSTRACT

A highly sensitive superregenerative microwave receiver is disclosed having a special utility for radar altimeters. A tunnel diode oscillator-amplifier section is arranged on a stripline board one wavelength square with the housing forming the ground plane and with the tunnel diode centered on the board. A threaded member in the top of the housing cooperates with a conductor track on the stripline board to tune the oscillator resonant circuit. A detector and self-test stripline board is positioned in another compartment of the housing separated from the oscillator-amplifier board by means of a bulkhead but connected to said board by means of a feed-through connector. This board contains the radio frequency input port and includes a stripline coupler arrangement to connect the radio frequency signal to the detector diode. A stripline filter connected between the radio frequency input and the oscillator-amplifier provides both second harmonic rejection and d. c. blocking to prevent any d. c. component of the modulating pulse from reaching the detector. A self-test capability is provided including a pair of diode switching circuits which make it possible to effectively disconnect the received radio frequency signal and connect a test radio frequency signal to the detector.

8 Claims, 4 Drawing Figures

PATENTED JUN 20 1972 3,671,868
SHEET 1 OF 2
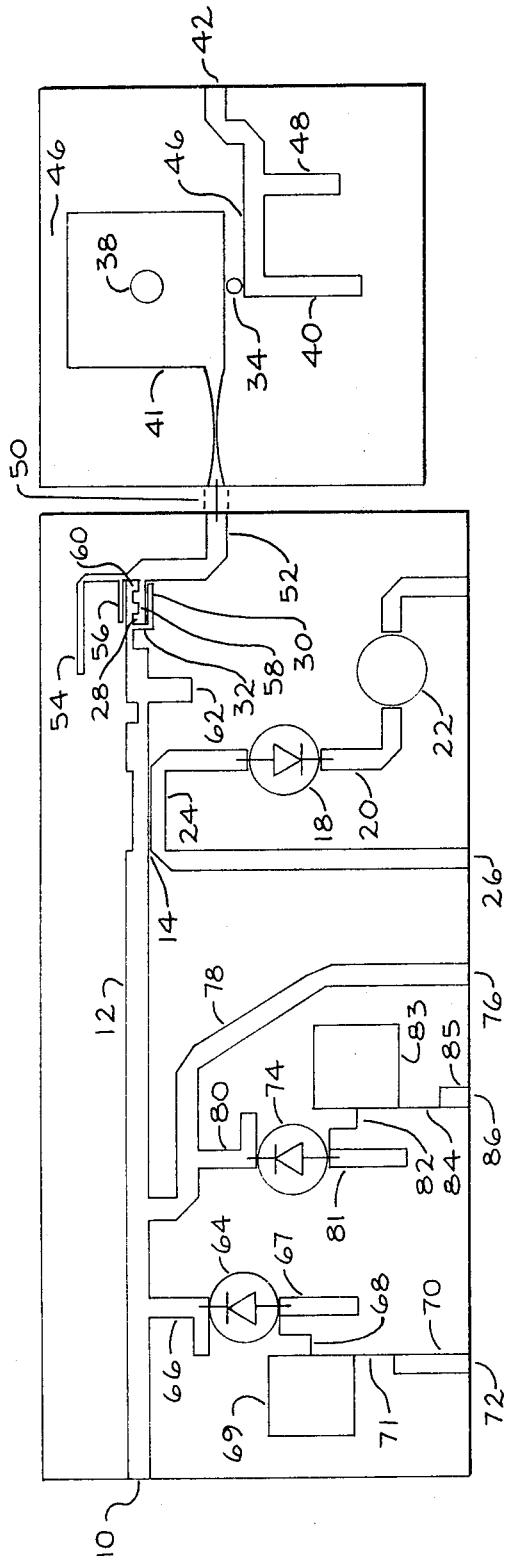
Fig. 2a
Fig. 2b
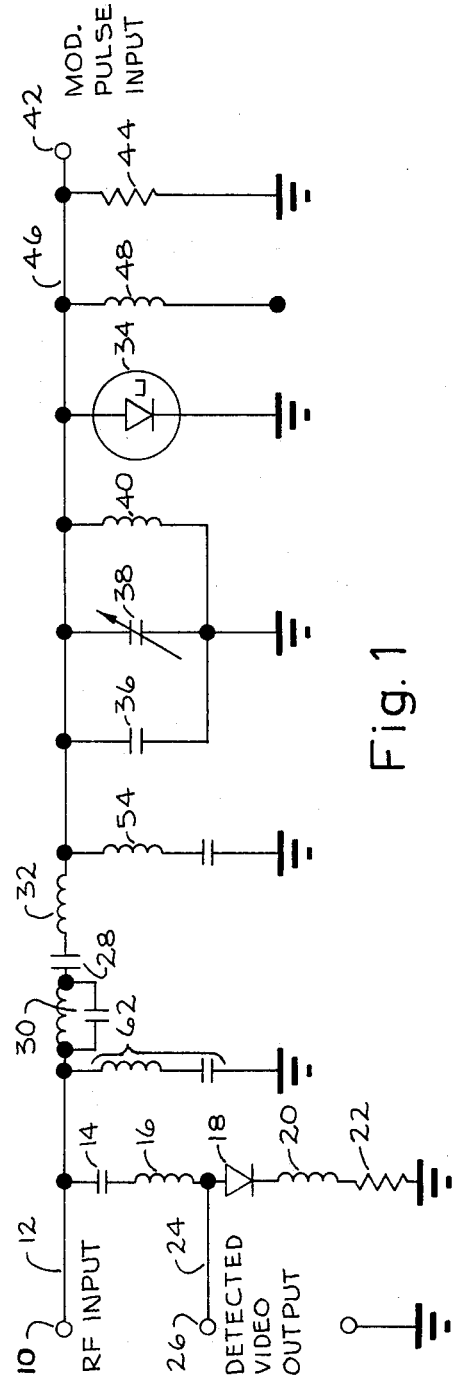
Fig. 1
INVENTOR
B. J. SANDERS
BY
*Robert C Smith*
ATTORNEY

PATENTED JUN 20 1972
3,671,868
SHEET 2 OF 2

INVENTOR
B. J. SANDERS

BY Robert C. Smith
ATTORNEY

SUPERREGENERATIVE MICROWAVE RECEIVER

BACKGROUND OF THE INVENTION

Radar altimeters operating in the microwave frequency range have been in service for a number of years. The receiver portion of such systems has been a source of both production and serviced difficulties, due largely to the vacuum tube microwave cavities which have been used. Sensitivity has not been as to fabricate as desired due to the inherently high noise levels associated with the vacuum tubes. This limitation in sensitivity has also added to costs by requiring that the transmitter used produce higher output power. Because of the limited life of vacuum tubes, the service life has been such that intervals between inspections have been undesirably short. There has also been a problem in finding vacuum tubes which will consistently oscillate at the high frequencies used The microwave cavity structure itself in which the tube is installed is a precision assembly which is costly to fabricate. This cost is reflected both in production cost and in assembly time. The substantial assembly time results from a comparatively complex structure which has resulted in substantial rework time and overhaul expense. Another disadvantage of the vacuum tube microwave cavity is that power requirements are in the order of watts as compared to microwatts for some semiconductor devices. There has, therefore, been a need to substantially improve performance of receivers for radar altimeters through improved sensitivity and reliability while reducing fabrication and assembly costs.

SUMMARY OF THE INVENTION

The difficulties enumerated above led to studies which resulted in the belief that it would be possible to produce a radar receiver using solid state components and current microwave technology which would be superior in most respects to those which have been used in the past. A key component in the system is the semiconductor device used in the oscillator section. This could be any of several such devices having a negative resistance characteristic, but the tunnel diode is most attractive due to its having the lowest noise characteristic. As compared with a conventional planar triode having noise factors on the order of 15 db, the corresponding figure for the tunnel diode is 2 to 3 db. This yields a substantial theoretical gain in the sensitivity, and this gain has been realized in practice. Other advantages reside in its high frequency capability, frequency stability and extreme circuit simplicity.

By associating the tunnel diode with appropriate stripline inductance and capacitance means, and with the use of a proper stabilizing resistor to insure a mono-stable operating point, a very low noise, high gain, oscillator-amplifier section may be produced which occupies a small volume. Because of the need to incorporate a self-test function in the receiver package, a bulkhead was used to divide the housing into two compartments, the oscillator-amplifier circuit occupying one portion and being essentially one wavelength square, thereby allowing the remaining circuits (switch assembly, filter and detector) to occupy whatever volume necessary while not affecting the oscillator-amplifier. Alternatively, the detector, filter and switch assembly could be built in the same compartment with the oscillator-amplifier provided the even multiple quarter wavelength concept is maintained. A simple conductor track constituting a quarter-wave open-ended stub introduces a very high impedance to any mismatch from the input connector. A metal plunger associated with the housing makes it possible to vary the capacitance in the oscillator-amplifier to thus tune the oscillator for different tunnel diodes or to compensate for other factors such as dimensional variations which might cause the center frequency to vary somewhat.

A stripline filter section is imposed between the oscillator-amplifier section and the detector section which is basically a second harmonic rejection filter but which also provides d.c. blocking to keep any d.c. component of the modulating pulse from reaching the detector.

The oscillator-amplifier's output is connected to the detector diode through a stripline directional coupler. Additional stripline inductor tracks cooperate with a radio frequency resistor to form the detector circuit which then supplies the detected signal to an output port.

A solid-state switching assembly is incorporated in the receiver package to provide a self-test function. The switch assembly consists of two shunt-connected diode switch circuits. The receiver switch is biased off during normal operation and allows the input signal to travel on to the receiver proper without being attenuated, whereas the self-test switch is biased on during normal operation and shunts the RF self-test signal to ground so that it will not be felt on the main transmission line during normal operation. During the self-test mode of operation, the reverse action takes place on each switch.

DESCRIPTION OF THE DRAWINGS

FIG. 1 is a circuit diagram showing, in terms of conventional symbols, an equivalent circuit to that in my superregenerative receiver.

FIG. 2a is a plan view of the stripline board for the oscillator-amplifier section of my receiver.

FIG. 2b is a plan view of the stripline board for the detector and self-test section of my receiver.

DESCRIPTION OF THE PREFERRED EMBODIMENT

Figure 3:
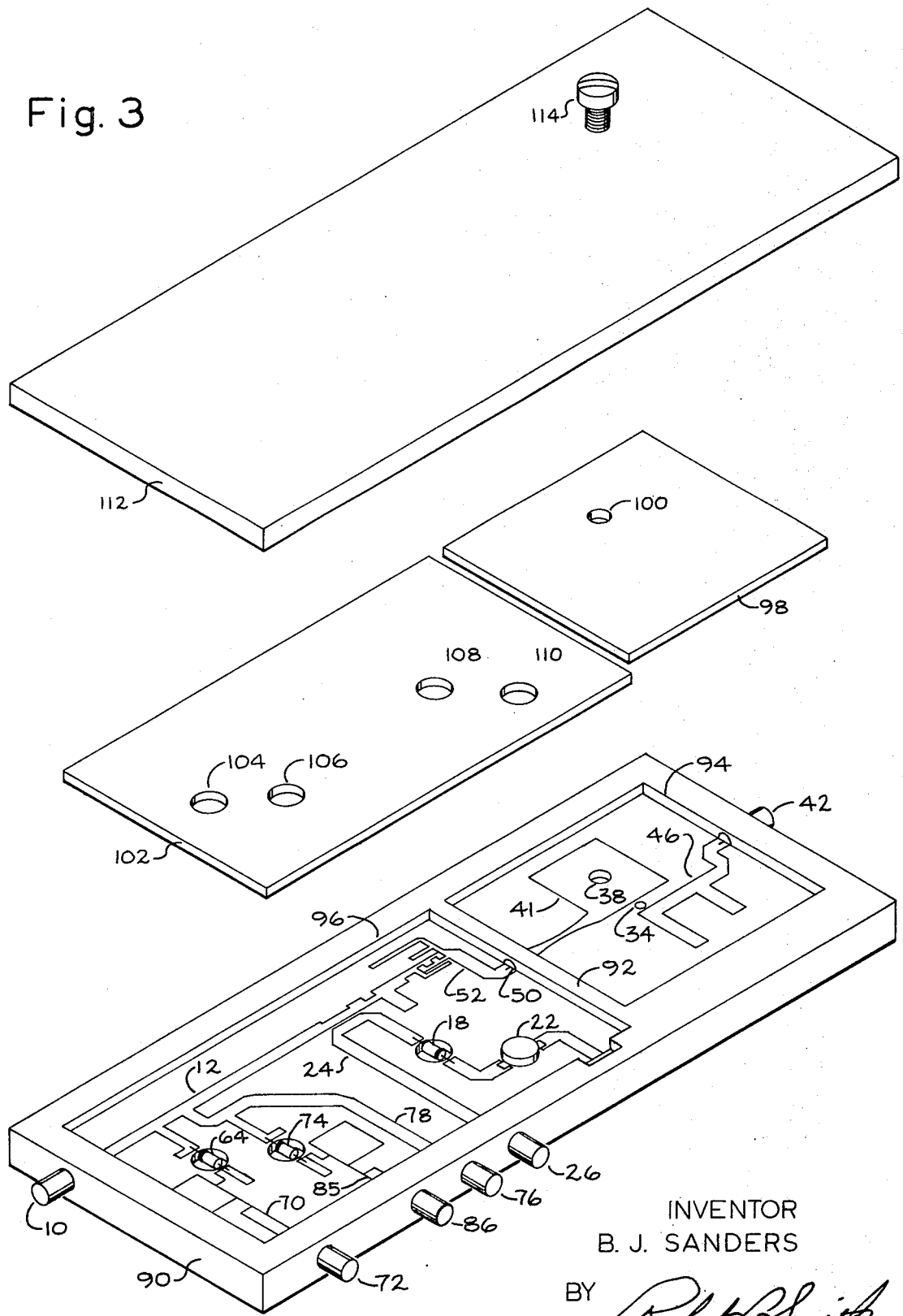
FIG. 3 is an exploded view showing the physical orientation of the parts of my microwave receiver including the stripline boards and housing members.

FIG. 1 is a schematic drawing of a somewhat simplified equivalent circuit for my strip-transmission line superregenerative microwave receiver. The radio frequency input signal is supplied between ground and an input terminal 10 connected to an input conductor 12. Connected between the input line 12 and ground are a capacitive coupling means 14, an inductor 16, a detector diode 18, an inductor 20, and a resistor 22. An acceptable detector diode for this application is a Sylvania 1N830. (The coupling means 14 in the stripline circuit is actually somewhat more involved than the simple series-connected capacitor 16 and inductor 14 and may be similar to the directional coupler described in an article entitled "A Low Noise Class-C Oscillator Using a Directional Coupler" by Harry J. Peppiatt, James A. Hall and A. V. McDaniel, Jr., appearing in IEEE Transactions on Microwave Theory and Techniques, MTT-16, No. 9, Sept. 1968, pp. 750 and 751.) The detected video output from this receiver appears on a conductor 24 connected between inductor 16 and diode 18 and is supplied to an output terminal 26. The input conductor 12 is also connected to a second harmonic rejection filter including the resonant circuit 30 and an additional inductance means 32 which are coupled together across a capacitance means 28. Also forming part of the filter are first and second bypass paths 62 and 54, each including inductance and capacitance means. Inductor 32 is connected to the oscillator-amplifier section which includes as an active element tunnel diode member 34 with one side of the diode connected to a first capacitance 36, a variable capacitance 38 and an inductance 40, said capacitance and inductance members being connected in parallel with respect to each other between one side of the diode 34 and ground. Acceptable tunnel diodes for this purpose are MicroState Electronics' MS-1590 or K.M.C., A1005D.

The modulating pulse input signal for the oscillator-amplifier is supplied to a terminal 42 where it appears across a stabilizing resistor 44 whose function is to set the proper load line for the oscillator-amplifier to insure a mono-stable operating point. Input at terminal 42 is supplied along a conductor 46 to a quarter wave, open-ended inductive tuning stub 48, the purpose of which is to introduce a very high impedance to any mismatch from the input terminal 42. This input signal is supplied to the ungrounded terminal of tunnel diode 34 where it serves to modulate the regenerative circuit so that the effective conductance across the tuned circuit is alternately positive and negative, the positive predominating for long-time stability but the negative enduring sufficiently long to cause the signal to build up normally to a large amplitude some time during each modulation cycle, as is well understood by those familiar with the art of superregenerative receivers.

FIG. 2a is a plan view of a stripline board which includes the oscillator-amplifier portion of my receiver. In FIGS. 2a and 2b I have used similar numerals to those shown in FIG. 1 to apply to the similar components. The stabilizing resistor 44, which is outside of the stripline board 2a, is not shown, but the modulating pulse input signal is supplied to an input terminal 42 which is a coaxial connector which electrically is a portion of the conductor track 46. The quarter wavelength, open-ended stub 48 and the inductor member 40 forming part of the oscillator circuit are each actually formed as part of the conducting track 46. The tunnel diode member 34 is positioned in the exact center of the oscillator-amplifier stripline board such that it is in very close proximity to the inductor track 40 and to the capacitor track 41. The first capacitor 36 actually exists as a distributive capacitance between the housing and capacitor track 41. The variable capacitance 38 consists of a threaded plunger which is movable with respect to the circular opening in the center of conductor track 41 and which is threadedly engaged with the housing.

The radio frequency input from an antenna (not shown) is supplied to the terminal 10 at the left side of FIG. 2b from whence it is carried along the conductor track 12 to an arrangement of closely spaced conductor tracks. A portion of track 12 is maintained at a close spacing with an additional conductor track 24 connected to the diode 18 and also to the detected video output port 26. The capacitance 14 and inductance 16 schematically shown in FIG. 1 at numeral 14 actually exist as the adjacent portions of conductors 12 and 24 and the spacing between said conductors. Connected between the opposite side of detector diode 18 and ground is a conductor strip which includes an inductor 20 for controlling the band width of the video output and a radio frequency resistor 22. An extension of conductor 12 between the detector circuit and the oscillator-amplifier forms part of the second harmonic rejection filter section described above.

An extension of the capacitance conductor track 41 is supplied through a bulkhead in the housing separating the two stipline boards by means of a radio frequency coupler 50 to connect with a conductor track 52 which, in turn, is formed to include conductor strips 54 and 56 which have both inductance and capacitance effects and a notched section 58 which cooperates with a similar notched section 60 formed in conductor track 12. The value of capacitance 28 (FIG. 1) actually is controlled by the effective common length of sections 58 and 60 as well as the closely contiguous sections of parts 56 and 30. The larger size open-ended conductor track 62 forming part of track 12 also has both inductive and capacitive characteristics as indicated in FIG. 1. The filter above described forms no part of the present invention per se other than satisfying a need for a second harmonic rejection filter having the desired frequency characteristics. Other configurations known to those skilled in the art will perform this function in a similar manner.

Also connected to conductor track 12 are two diode switching means which provide a self-test function for the receiver. A diode 64 with the associated conductor tracks 66, 67, 68, 69, 71 and 70 constitutes a switching circuit with appropriate capacitive and inductive filtering means such that when a forward bias signal is applied to an input terminal 72, diode 64 is caused to conduct current, and the radio frequency input signal at terminal 10 "sees" an apparent short circuit through the diode 64, thereby being shunted away from the detector circuit. At the frequency of the received signal with diode 64 turned on, the diode and track 66 appear like a half wave stub, thus constituting a low impedance to the signal at terminal 10. Track 67 becomes a quarter wave open-ended stub, track 69 functions similarly to a series inductance and capacitance, and track 71 is a section of 125-ohm transmission line which imposes a comparatively high impedance to the RF signal to prevent leakage. When a reverse bias signal is supplied at terminal 72, the diode 64 does not conduct. The radio frequency signal at input port 10 then "sees" track 66 as a high impedance quarter wave stub and so follows along conductor 12.

Connected to conductor 12 one quarter wavelength away from track 66 are parallel circuits, one through a switching diode 74 and another from a test signal input terminal 76 to a conductor 78. Diode 74 is shown in association with conductor tracks consisting of members 80, 81, 82, 83, 84, and 85, whose function and operation are essentially analogous to members 66, 67, 68, 69, 71 and 70 above described. In normal operation, the diode 74 is biased on with the result that any radio frequency signal appearing at terminal 76 will see an apparent short circuit through the diode 74 and will not appear on the input line to the oscillator-amplifier circuit. When it is desired to self-test the receiver, proper bias signals are applied to input ports 72 and 86 such that diode 64 is caused to shunt the RF signal from port 10 away from the oscillator-amplifier, and diode 74 is caused to be shut off, thereby permitting a signal from the test radio frequency terminal 70 to appear on conductor 12 and be supplied to the oscillator-amplifier circuit. Diodes 64 and 74 may be Hewlitt-Packard 3039's, and if other diodes or combinations thereof are used, the related stripline structure may vary somewhat because the diode characteristics enter into the effective stripline length.

FIG. 3 is an exploded view of my receiver showing the relationships of the parts including the circuit board shown in FIGS. 2a and 2b and the housing. The input radio frequency port 10 is in the form of a coaxial connector fastened through the wall of a lower housing member 90 to the conductor track 12 in the detector and self-test board. Similar coaxial connectors 72, 86, 76, 26 and 42 provide connections through the side wall of member 90 to tracks 70, 85, 78, 24 and 46, respectively. A bulkhead 92 divides housing member 90 into two compartments 94 and 96 housing the separate stripline boards, and a feed-through connector 50 provides a connection between the filter section connected to track 52 and the oscillator-amplifier board in compartment 94.

Arranged to cover the oscillator-amplifier board in compartment 94 is a board 98 of dielectric material which includes a port 100 aligned with the opening 38 in track 41. A second board 102 of dielectric material covers the detector self-test board in compartment 96 except for ports 104, 106, 108 and 110 which are aligned to provide space for diodes 64, 74 and 18 and the radio frequency resistor 22, respectively.

A top member or cover 112 is arranged to cover the assembly and is fastened to member 90 by any suitable means. Those skilled in the art will appreciate that a suitable radio frequency sealing means will normally be placed between members 90 and 112. Threadedly engaged with cover 112 is a screw 114 which is adjustably positioned relatively to port 38 to vary the effective capacitance of the oscillator circuit. This adjustment means is not absolutely essential for operation, but is reasonably required for volume production since the tunnel diodes used will normally vary sufficiently to require tuning of each separate oscillator-amplifier circuit.

The receiver configuration shown and described herein has been designed for 4.3 $GH_z$ but will perform well over a substantial frequency range such as approximately 3–10 $GH_z$. For lower or higher frequencies, similar circuits may give rise to some variation in physical configuration.

I claim:

1. A superregenerative microwave receiver comprising:
   stripline means including conductor means, dielectric board supporting means and housing means supporting said stripline means serving as ground plane means associated with said conductor and dielectric board means,
   a semiconductor device having a negative resistance characteristic associated with said conductor means, said conductor means including a track for receiving an input pulse with said track including inductance means positioned adjacent said semiconductor device and a track including capacitance means, filter means connected to said capacitance means, a detector diode including inductive tuning means, an output port and a first conductor track connecting said detector diode with said output port, a radio frequency input port and a second conductor track connecting said input port with said filter means, said first and second conductor tracks including means for coupling radio frequency input signals to said detector diode;

said housing means including a bulkhead dividing said housing means into two compartments, one of said compartments containing said negative resistance semiconductor device substantially centered therein, said input pulse track and said adjustable capacitance means, said compartment being approximately one wavelength square.

2. A superregenerative microwave receiver as set forth in claim 1 wherein said track including capacitance means includes means for adjusting the capacitance thereof.

3. A superregenerative microwave receiver as set forth in claim 1 wherein the other of said compartments includes said detector diode, said filter means and said first and second conductor tracks.

4. A superregenerative microwave receiver as set forth in claim 3 wherein said other compartment further contains diodes switch means and associated stripline conductor means for disconnecting the signal at said input port from said coupling means and additional diode switching means and associated stripline conductor means are provided to connect a radio frequency test signal to said coupling means.

5. A superregenerative microwave receiver as set forth in claim 1 wherein said input pulse track has an input port connected to said track and a quarter wavelength tuning stub is connected to said track intermediate said input port and said inductance means.

6. A superregenerative microwave receiver as set forth in claim 1 wherein said semiconductor device is a tunnel diode and tuning means are provided in association with said ground plane means and said stripline capacitor track for adjusting the capacitance thereof.

7. A superregenerative microwave receiver as set forth in claim 1 wherein first diode switch means is connected to said first conductor track for disconnecting the signal at said radio frequency input port from said coupling means and additional diode switching means are provided to connect a radio frequency test signal to said coupling means.

8. A superregenerative microwave receiver comprising:

a housing including a bulkhead dividing said housing into a first compartment and a second compartment, a first stripline board in said first compartment and a second stripline board in said second compartment, said housing acting as a ground plane for the conductors on said boards;

said first stripline board cooperating with said housing to provide an oscillator section, said oscillator including a tunnel diode positioned substantially at the center of said board, a stripline inductor track adjacent said tunnel diode, a stripline capacitor track positioned adjacent said diode including adjustment means carried in said housing and cooperating with said capacitor track to vary its capacitance, a coaxial connector attached to said housing for receiving a pulse input, conductor means connecting said coaxial connector to said stripline inductor, and a quarter wave open-ended stub connected to said conductor between said connector and said inductor track;

said second stripline board cooperating with said housing to provide a detector section including a stripline conductor attached to said stripline capacitor track through said bulkhead, a filter formed in said stripline conductor, a radio frequency port and a second stripline conductor connecting said port with said filter, a detector diode and stripline means coupling said detector diode to said second stripline conductor, inductive tuning means connected to said detector diode, a video output port connected to said housing and conductor means forming part of said stripline means connecting said detector diode to said video output port.

* * * * *